April 8, 1930.     F. H. CWENS     1,753,530
TALKING PICTURE APPARATUS
Filed July 13, 1927
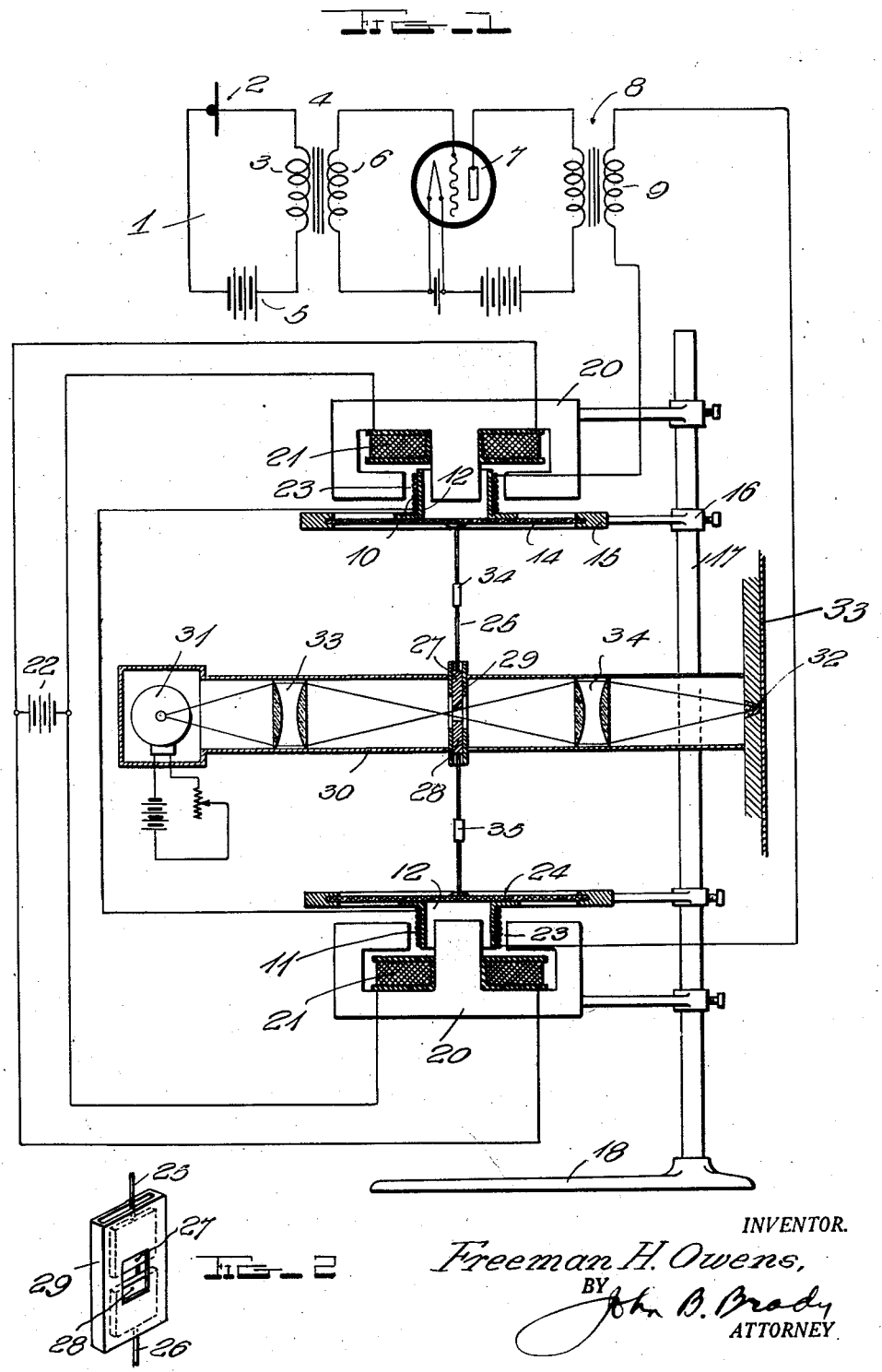
INVENTOR.
Freeman H. Owens,
BY
John B. Brady
ATTORNEY Patented Apr. 8, 1930

1,753,530

UNITED STATES PATENT OFFICE

FREEMAN H. OWENS, OF NEW YORK, N. Y.

TALKING-PICTURE APPARATUS

Application filed July 13, 1927. Serial No. 205,440.

My invention relates broadly to talking-picture apparatus and more particularly to an electrical system for recording sound records on film.

One of the objects of my invention is to provide a system for recording sound upon film wherein a record may be placed upon the film of such a character that reproduction with clear modulation may be obtained from the sound record.

Another object of my invention is to provide a construction of sound recording apparatus wherein a sound record of a width substantially greater than that heretofore obtained may be placed upon the film for enabling a strong reproduction to be obtained during the reproducing process.

Still another object of my invention is to provide an electromagnetic control system for exposing a film to variable light rays in accordance with sound vibrations in such manner that a record is placed upon the film which can be subsequently employed for sound reproduction at large volume.

My invention will be more clearly understood from the specification hereinafter following by reference to the accompanying drawing in which:

Figure 1 shows diagrammatically the arrangement of the apparatus and the circuit interconnecting the electromagnetic control system of my invention; and Fig. 2 is a perspective view of the electromagnetic controlled shutter employed in the recording system of my invention.

The recording apparatus of my invention includes a voice control circuit and a pair of electromagnetic members which are arranged to control the position of two shutters, the shutters being capable of movement toward or away from each other for controlling the exposure of a film. The shutter consists of two units, one immediately above the other, which may simultaneously operate to give a double width opening for controlling the exposure of the film. By this method the light control apparatus may be moved farther away from the lens system for securing different widths in a vertical direction of the recorded sound upon the film. For example, if a width of .001 inches is required on the film for recording a sound of normal amplitude, then with a very much weaker sound directed against the modulating apparatus, the shutters open or close at a smaller amount. Considering the sound amplitude at one-half of normal the light aperture would open and close one-half the distance as compared with normal, so that by moving the film away from the lens so as to get the same width vertically of .001 inches, and by increasing the light the same exposure can be had for a weaker sound as was had for the normal sound. By adjusting the distance between the shutters and the light source all sound records can be made of the same density, that is, exposure on the film, and this is especially desirable in sound records where the sound is normally very weak so as to produce a strong reproduction with clear modulation. In the recording fluctuating lamp type of sound picture apparatus the normal exposure of the lamp over-exposes the weak fluctuations of the sound. The electromagnetically actuated system of my invention has the distinct advantage of securing larger amplitude of reproduction with more faithful modulation, so that articulation of the reproduced sound when the film is projected is extremely clear.

Referring to the drawings in more detail, the pick-up circuit is represented by reference character 1 as including microphone 2, primary winding 3 of transformer 4 and battery system 5. The secondary winding 6 of transformer 4 connects to the input circuit of the audio frequency amplification system and may include a number of stages of amplification but which I have represented generally as constituting electron tube 7. The output circuit of the amplifier connects to transformer system 8 having a secondary winding 9 which connects to two independent windings 10 and 11 arranged in series. The windings 10 and 11 are each carried upon a coil support 12 which is secured centrally of a plate glass diaphragm 14, which is supported in a suitable ring member 15 adjustably secured at 16 to the supporting frame 17. A supporting base 18 is provided carrying the supporting frame 17, from which the several parts of the equipment are adjustably mounted. A magnetic core system 20 is adjustably carried on the frame 17 with a permanent field winding 21 disposed thereon and excited from battery system 22. A magnetic gap 23 is provided between the pole pieces of the magnetic core system, and within this magnetic gap the windings 10 and 11 are arranged to float in such position that changes in energy through the windings 10 and 11 by virtue of changes in the modulation of circuit 1 operate to impart vibrations to the windings 10 and 11, coil support 12, by which the diaphragm 14 and diaphragm 24 is vibrated, in turn imparting vibrations to rod members 25 and 26 and to the shutter members 27 and 28 operative within the guiding casing 29. The shutter members 27 and 28 are positioned in the path of a housing 30, being provided with a light source 31 at one end thereof and with a light opening 32 at the opposite end thereof. The film is represented at 33 as moving adjacent the light slit 32. A condensing lens system 33 is provided between the light source 31 and the shutters 27 and 28, and a projection lens system 34 is provided between the shutters 27 and 28 and the film 33. Adjustable screw devices 34 and 35 are placed in the links 25 and 26 for enabling the proper adjustment in the position of shutters 27 and 28 to be made. Sound vibrations controlling the modulation circuit produce the effect of moving both shutters 27 and 28, thereby enlarging the exposure of the light source upon the film. The light does not reach the film unless the diaphragms are moved in accordance with sound waves.

While I have described my invention in one of its preferred embodiments, I desire that it be understood that modifications may be made and that no limitations upon my invention are intended other than are imposed by the scope of the appended claims.

What I claim as new and desire to secure by Letters Patent of the United States is as follows:

1. In a sound recording system, a film, a light source, a lens system for directing said light source upon said film, a frame member for supporting said lens system, a pair of shutter members slidably disposed in said frame member between said light source and said film, electromagnetic devices arranged to control said shutter members, and a series circuit connecting each of said electromagnetic devices for variably controlling the operation thereof in accordance with sound vibrations for correspondingly controlling the exposure of said film with respect to said light source.

2. In a sound recording system, a film, a light source, a tubular frame member, a lens system for directing rays of light from said source upon said film, said lens system being mounted in said frame member, and a pair of electromagnetically actuated shutters slidably mounted in said frame member interposed in the path of said lens system and each simultaneously actuated in accordance with sound vibrations for correspondingly controlling the exposure of said film with respect to said light source.

3. A sound recording system comprising a film, a light source, a lens system for directing rays of light from said source upon said film and a light slit interposed in the path of said lens system, said light slit including a pair of slidably mounted shutters, extendable members connected to each of said shutters, electromagnetic devices associated with said extendable members for actuating each of said shutters, and a series connected control circuit including each of said electromagnetic devices for actuating said shutters in accordance with sound vibrations for variably exposing said film to the light rays from said source.

4. A sound recording system comprising a film, a light source, a lens system for directing rays of light from said source upon said film, and a light slit interposed in the path of said lens system, said light slit comprising a centrally apertured envelope member and a pair of plate members slidable within said envelope member, an electromagnetic device adjustably connected with each of said plate members for simultaneously advancing or retracting said plate members, a series connected control circuit including each of said electromagnetic devices for variably modifying the condition of said electromagnetic devices and varying the position of said plate members with respect to each other for limiting the exposure of said film with respect to said light source.

5. In a sound recording apparatus a pair of slidable shutter members constituting a light slit, a diaphragm adjustably connected to each of said shutter members, and an electromagnetic actuator adjacent each of said diaphragms for imparting vibrations to said diaphragm in accordance with sound vibrations and correspondingly controlling the size of said light slit.

In testimony whereof I affix my signature.

FREEMAN H. OWENS.